(12) United States Patent
Lahetkangas et al.

(10) Patent No.: US 9,999,026 B2
(45) Date of Patent: Jun. 12, 2018

(54) DECIDING TRANSMISSION PARAMETERS

(75) Inventors: Eeva Lahetkangas, Oulu (FI); Esa Tapani Tiirola, Kempele (FI); Kari Pekka Pajukoski, Oulu (FI); Ilkka Harjula, Oulu (FI)

(73) Assignee: Nokia Solutions and Networks Oy, Espoo (FI)

(*) Notice: Subject to any disclaimer, the term of this patent is extended or adjusted under 35 U.S.C. 154(b) by 0 days. days.

(21) Appl. No.: 14/419,868

(22) PCT Filed: Aug. 22, 2012

(86) PCT No.: PCT/EP2012/066289
§ 371 (c)(1),
(2), (4) Date: Feb. 5, 2015

(87) PCT Pub. No.: WO2014/029426
PCT Pub. Date: Feb. 27, 2014

(65) Prior Publication Data
US 2015/0189624 A1 Jul. 2, 2015

(51) Int. Cl.
| | |
|---|---|
| *H04W 72/04* | (2009.01) |
| *H04W 72/02* | (2009.01) |
| *H04W 72/08* | (2009.01) |
| *H04W 72/12* | (2009.01) |
| *H04W 76/02* | (2009.01) |

(52) U.S. Cl.
CPC ....... *H04W 72/02* (2013.01); *H04W 72/0413* (2013.01); *H04W 72/082* (2013.01);
(Continued)

(58) Field of Classification Search
None
See application file for complete search history.

(56) References Cited

U.S. PATENT DOCUMENTS

| | | | | |
|---|---|---|---|---|
| 6,160,999 A | * | 12/2000 | Chheda | ........ H04W 52/40 370/320 |
| 7,403,748 B1 | * | 7/2008 | Keskitalo | ........ H04B 7/06 455/101 |

(Continued)

FOREIGN PATENT DOCUMENTS

| | | |
|---|---|---|
| CN | 101860945 A | 10/2010 |
| EP | 1737263 A1 | 12/2006 |

(Continued)

OTHER PUBLICATIONS

International Search Report and Written Opinion for International Application No. PCT/EP2012/066289, dated Jan. 18, 2013, 13, pages.

(Continued)

*Primary Examiner* — Hassan Phillips
*Assistant Examiner* — Ayanah George
(74) *Attorney, Agent, or Firm* — Brake Hughes Bellermann LLP

(57) ABSTRACT

A technique including: making at a communication device a provisional decision about one or more transmission parameters for a transmission from the communication device to an access network or another communication device via radio resources managed by an access network; communicating the provisional decision to the network or the another communication device; and receiving from the access network or the another communication device an indication of a final decision about the transmission parameters for the transmission from the communication device to the access network or another communication device.

19 Claims, 4 Drawing Sheets

(52) U.S. Cl.
CPC ........ *H04W 72/1231* (2013.01); *H04W 72/04* (2013.01); *H04W 72/1268* (2013.01); *H04W 76/023* (2013.01)

(56) References Cited

U.S. PATENT DOCUMENTS

| | | | |
|---|---|---|---|
| 2005/0083943 A1* | 4/2005 | Lee | H04L 47/10 370/395.4 |
| 2005/0249148 A1* | 11/2005 | Nakamata | H04L 47/14 370/328 |
| 2009/0196195 A1 | 8/2009 | Gerstenberger et al. | |
| 2010/0323732 A1 | 12/2010 | Nakaya et al. | |
| 2012/0202477 A1 | 8/2012 | Eriksson | |
| 2012/0300712 A1* | 11/2012 | Hakola | H04W 74/008 370/329 |
| 2013/0039199 A1* | 2/2013 | Liao | H04W 72/085 370/252 |

FOREIGN PATENT DOCUMENTS

| | | | | |
|---|---|---|---|---|
| EP | 2120475 A1 * | 11/2009 | ........ | H04W 52/0206 |
| JP | 10-243448 A | 9/1998 | | |
| JP | 2008-510343 A | 4/2008 | | |
| JP | 2009525644 A | 7/2009 | | |
| JP | 2009-296662 A | 12/2009 | | |
| KR | 10-2008-0113837 A | 12/2008 | | |
| KR | 10-2010-0025942 A | 3/2010 | | |
| KR | 10-2012-0048325 A | 5/2012 | | |
| WO | 2012/071736 A1 | 6/2012 | | |
| WO | WO 2012071736 A1 * | 6/2012 | ........... | H04L 1/0015 |

OTHER PUBLICATIONS

English translation of Korean Office Action for Korean Application No. 10-2015-7006997, dated Nov. 3, 2015, 6 pages.
English translation of Japanese Office Action for corresponding Japanese Application No. 2015-525753, dated Jan. 27, 2016.
Final Office Action with English translation for Korean Application 10-2015-7006997, dated Dec. 28, 2016, 19 pages.
Office Action for Japanese Application 2015-525753, dated Aug. 22, 2016, 7 pages.
First Office Action for Chinese Application 201280075336.3, dated Aug. 1, 2017, 10 pages.
Second Office Action for Chinese Application 2012800753363, dated Mar. 12, 2018, 9 pages.

* cited by examiner

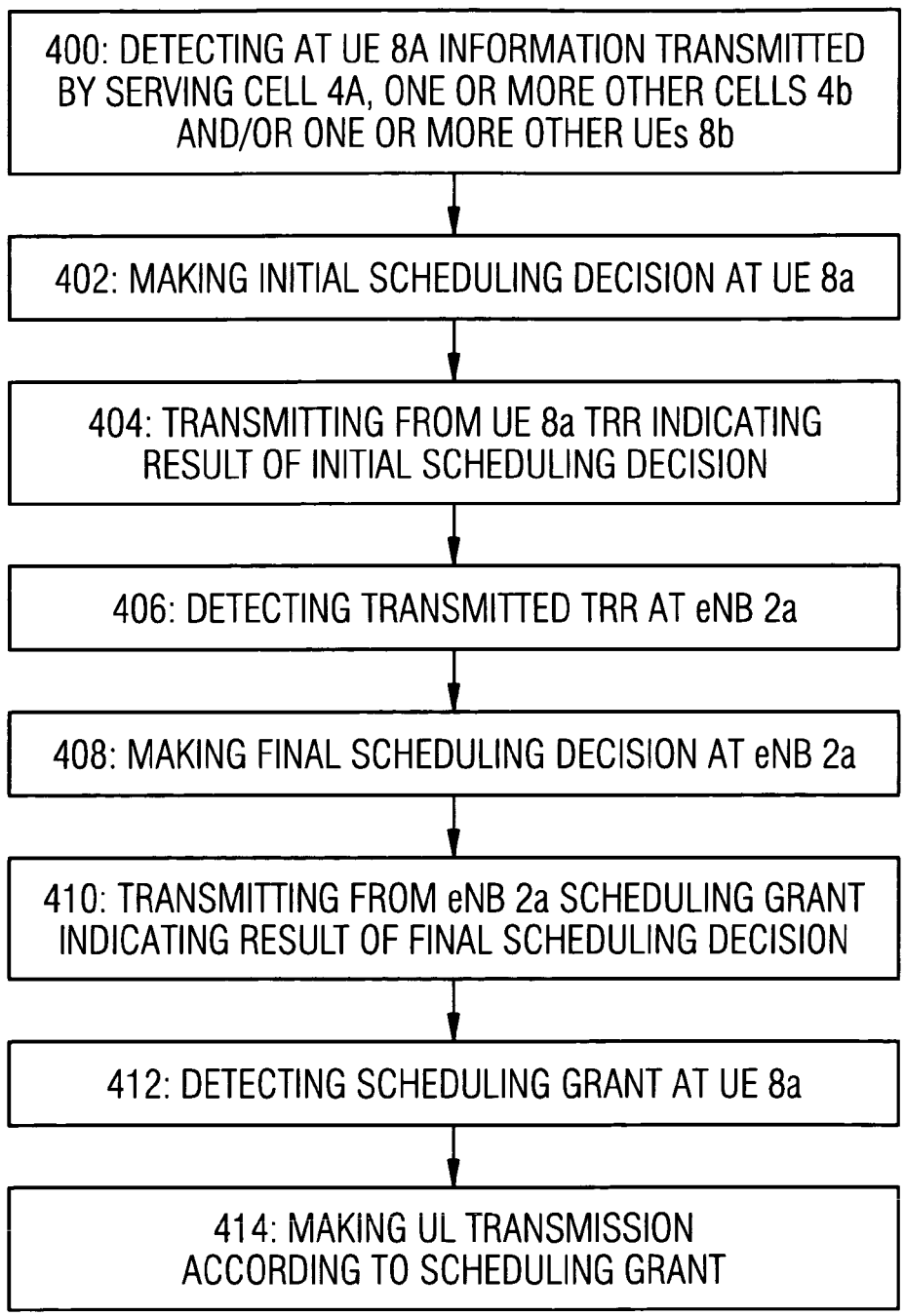

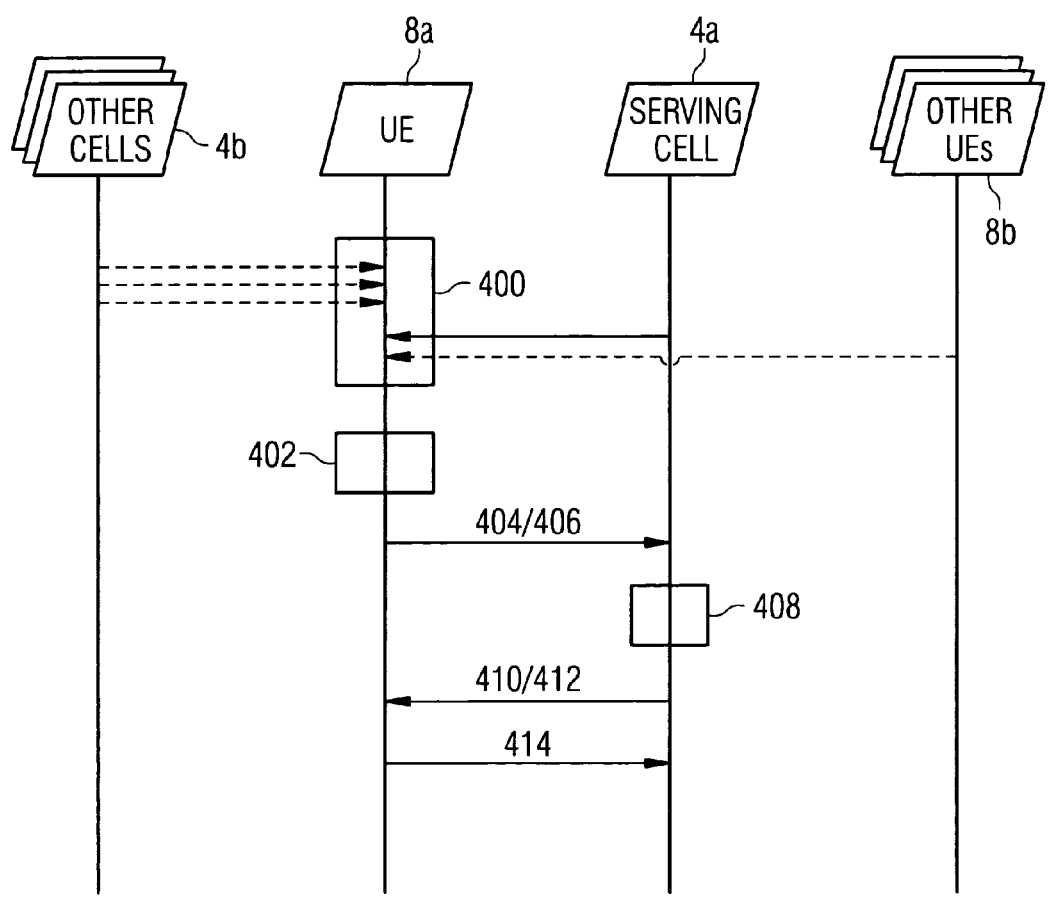

DECIDING TRANSMISSION PARAMETERS

This application is a national stage entry of PCT Application No. PCT/EP2012/066289, filed on Aug. 22, 2012, entitled "DECIDING TRANSMISSION PARAMETERS", which is hereby incorporated by reference in its entirety.

In some communication systems, radio transmissions from a communication device within the coverage of an access network and in the frequency spectrum managed by the access network involve making real time decisions about transmission parameters for the transmissions.

For example, in the case of uplink transmissions from communication devices to the access network, such decisions are made at the access network based on information transmitted by the communication device. Efforts at improving such decisions have been focussed on improving the communication of information from the communication device to the access network.

The inventors for the present application have instead developed a new approach for improving the deciding of transmission parameters for transmissions from communication devices.

There is hereby provided a method comprising: making at a communication device a provisional decision about one or more transmission parameters for a transmission from said communication device to an access network or another communication device via radio resources managed by an access network; communicating said provisional decision to said access network or said another communication device; and receiving from said access network or said another communication device an indication of a final decision about the transmission parameters for said transmission from said communication device to said access network or another communication device.

According to one embodiment, the method comprises: detecting interference information transmitted by said access network or said another communication device about interference at the receiver for said transmission from said communication device; and wherein making said provisional decision is based partly on said interference information transmitted by said access network or said another communication device.

According to one embodiment, said receiver for said transmission from said communication device comprises an array of receiving antennas; and said interference information includes information about interference at each of said receiving antennas or group of antennas.

According to one embodiment, said transmission from said communication device is to another communication device, and the method further comprises: detecting interference information transmitted by said another communication device about interference at the receiver for said transmission; and wherein making said provisional decision is based partly on said interference information transmitted by said another communication device.

According to one embodiment, said indication of a final decision about the transmission parameters for said transmission from said communication device to said access network or another communication device comprises an indication of the difference between said provisional decision and said final decision.

According to one embodiment, the method comprises: also sending to said access network or another communication device information that facilitates a resolution at said access network or another communication device of a conflict between said provisional decision received from said communication device and one or more other provisional decisions received at said access network or another communication device from one or more other communication devices, or another scheduling decision made by said access network or another communication device.

According to one embodiment, the transmission from said communication device is an uplink transmission to said access network, and further comprising determining at said communication device which network cell exhibits the best radio link with said communication device, and using said network cell for communicating said provisional decision to said access network.

There is also hereby provided a method comprising: receiving from a communication device at an access network or another communication device a communication about a provisional decision made at said communication device about one or more transmission parameters for a transmission from said communication device to said access network or another communication device via radio resources managed by the access network; determining to what extent said initial scheduling decision can be accepted by the access network or another communication device; and transmitting to said communication device an indication of a final decision about the transmission parameters for said transmission from said communication device to said access network or another communication device.

According to one embodiment, the method comprises: transmitting from said access network or another communication device interference information about interference at the receiver for said transmission from said communication device, which interference information is of use by said communication device when making said provisional decision.

According to one embodiment, said receiver for said transmission from said communication device comprises an array of receiving antennas; and said interference information includes information about interference at each of said receiving antennas or group of antennas.

According to one embodiment, said indication of a final decision about the transmission parameters for said transmission from said communication device to said access network or another communication device comprises an indication of the difference between said provisional decision and said final decision.

According to one embodiment, the method comprises: receiving at said access network or another communication device from said communication device information that facilitates a resolution at said access network or another communication device of a conflict between said provisional decision received from said communication device and one or more other provisional decisions received from one or more other communication devices, or another scheduling decision made by said access network or another communication device.

According to one embodiment, the one or more transmission parameters about which a provisional decision is made at the communication device comprise one or more of the following: the number of physical resource blocks for the transmission from the communication device; the frequency and/or time resources for the transmission from the communication device; the modulation and coding scheme for the transmission from the communication device; the transport block size for the transmission from the communication device; the MIMO scheme for the transmission from the communication device; the transmission rank for the transmission from the communication device; and the precoder vector for the transmission from the communication device.

According to one embodiment, the transmission from the communication device is an uplink transmission to an access node serving the communication device, and wherein the provisional decision made at the communication device is made at least partly on the basis of one or more of the following: the current status of the transmission buffer at the communication device; an estimate of the pathloss for the link between the communication device and the access node serving the communication device; channel state information for the link between the communication device and the access node serving the communication device; interference conditions in the cell serving the communication device; and information about the interference conditions and/or scheduling in one or more cells neighbouring the cell serving the communication device.

According to one embodiment, one or more of said estimate of the pathloss for the link between the communication device and the access node serving the communication device; and said channel state information for the link between the communication device and the access node serving the communication device, is derived from measurements at said communication device of transmissions made by the access node serving the communication device.

There is also provided an apparatus comprising: a processor and memory including computer program code, wherein the memory and computer program code are configured to, with the processor, cause the apparatus to: make at a communication device a provisional decision about one or more transmission parameters for a transmission from said communication device to an access network or another communication device via radio resources managed by an access network; communicate said provisional decision to said access network or said another communication device; and receive from said access network or said another communication device an indication of a final decision about the transmission parameters for said transmission from said communication device to said access network or another communication device.

According to one embodiment, the memory and computer program code are further configured to, with the processor, cause the apparatus to: detect interference information transmitted by said access network or said another communication device about interference at the receiver for said transmission from said communication device; and wherein making said provisional decision is based partly on said interference information transmitted by said access network or said another communication device.

According to one embodiment, said receiver for said transmission from said communication device comprises an array of receiving antennas; and said interference information includes information about interference at each of said receiving antennas or group of antennas.

According to one embodiment, said transmission from said communication device is to another communication device, and the memory and computer program code are further configured to, with the processor, cause the apparatus to: detect interference information transmitted by said another communication device about interference at the receiver for said transmission; and making said provisional decision is based partly on said interference information transmitted by said another communication device.

According to one embodiment, said indication of a final decision about the transmission parameters for said transmission from said communication device to said access network or another communication device comprises an indication of the difference between said provisional decision and said final decision.

According to one embodiment, the memory and computer program code are further configured to, with the processor, cause the apparatus to: also send to said access network or another communication device information that facilitates a resolution at said access network or another communication device of a conflict between said provisional decision received from said communication device and one or more other provisional decisions received at said access network or another communication device from one or more other communication devices, or another scheduling decision made by said access network or another communication device.

According to one embodiment, the transmission from said communication device is an uplink transmission to said access network; and the memory and computer program code are further configured to, with the processor, cause the apparatus to: determine at said communication device which network cell exhibits the best radio link with said communication device, and use said network cell for communicating said provisional decision to said access network.

There is also hereby provided an apparatus comprising: a processor and memory including computer program code, wherein the memory and computer program code are configured to, with the processor, cause the apparatus to: receive from a communication device at an access network or another communication device a communication about a provisional decision made at said communication device about one or more transmission parameters for a transmission from said communication device to said access network or another communication device via radio resources managed by the access network; determine to what extent said initial scheduling decision can be accepted by the access network or another communication device; and transmit to said communication device an indication of a final decision about the transmission parameters for said transmission from said communication device to said access network or another communication device.

According to one embodiment, the memory and computer program code are further configured to, with the processor, cause the apparatus to: transmit from said access network or another communication device interference information about interference at the receiver for said transmission from said communication device, which interference information is of use by said communication device when making said provisional decision.

According to one embodiment, said receiver for said transmission from said communication device comprises an array of receiving antennas; and said interference information includes information about interference at each of said receiving antennas or group of antennas.

According to one embodiment, said indication of a final decision about the transmission parameters for said transmission from said communication device to said access network or another communication device comprises an indication of the difference between said provisional decision and said final decision.

According to one embodiment, the memory and computer program code are further configured to, with the processor, cause the apparatus to: receive at said access network or another communication device from said communication device information that facilitates a resolution at said access network or another communication device of a conflict between said provisional decision received from said communication device and one or more other provisional decisions received from one or more other communication devices, or another scheduling decision made by said access network or another communication device.

According to one embodiment, the one or more transmission parameters about which a provisional decision is made at the communication device comprise one or more of the following: the number of physical resource blocks for the transmission from the communication device; the frequency and/or time resources for the transmission from the communication device; the modulation and coding scheme for the transmission from the communication device; the transport block size for the transmission from the communication device; the MIMO scheme for the transmission from the communication device; the transmission rank for the transmission from the communication device; and the precoder vector for the transmission from the communication device.

According to one embodiment, the transmission from the communication device is an uplink transmission to an access node serving the communication device, and wherein the provisional decision made at the communication device is made at least partly on the basis of one or more of the following: the current status of the transmission buffer at the communication device; an estimate of the pathloss for the link between the communication device and the access node serving the communication device; channel state information for the link between the communication device and the access node serving the communication device; interference conditions in the cell serving the communication device; and information about the interference conditions and/or scheduling in one or more cells neighbouring the cell serving the communication device.

According to one embodiment, one or more of said estimate of the pathloss for the link between the communication device and the access node serving the communication device; and said channel state information for the link between the communication device and the access node serving the communication device, is derived from measurements at said communication device of transmissions made by the access node serving the communication device.

There is also hereby provided a computer program product comprising program code means which when loaded into a computer controls the computer to: make at a communication device a provisional decision about one or more transmission parameters for a transmission from said communication device to an access network or another communication device via radio resources managed by an access network; communicate said provisional decision to said access network or said another communication device; and receive from said access network or said another communication device an indication of a final decision about the transmission parameters for said transmission from said communication device to said access network or another communication device.

There is also hereby provided a computer program product comprising program code means which when loaded into a computer controls the computer to: receive from a communication device at an access network or another communication device a communication about a provisional decision made at said communication device about one or more transmission parameters for a transmission from said communication device to said access network or another communication device via radio resources managed by the access network; determine to what extent said initial scheduling decision can be accepted by the access network or another communication device; and transmit to said communication device an indication of a final decision about the transmission parameters for said transmission from said communication device to said access network or another communication device.

Embodiments of the present invention are described in detail hereunder, by way of example only, with reference to the accompanying drawings, in which:

FIGS. 4 and 5 illustrate an example of operations at user equipment and eNodeB in FIG. 1 in accordance with an embodiment of the present invention.

Embodiments of the invention are described in detail below, by way of example only, in the context of a cellular network operating in accordance with an E-UTRAN standard.

Figure 1:
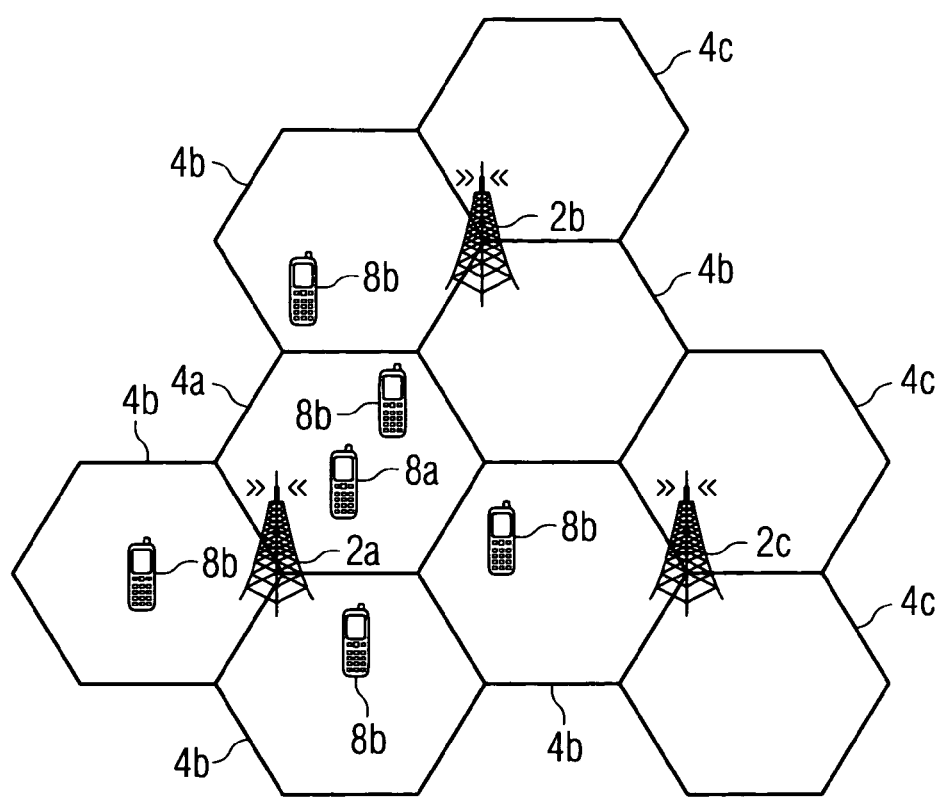
FIG. 1 illustrates an example of a cellular network in which embodiments of the present invention are implemented.

FIG. 1 illustrates an example of a cellular network in which embodiments of the present invention can be implemented. The cellular network includes cells 4 with transceivers at eNodeBs (eNBs) 2. Only nine cells (and the three eNBs associated with said cells) are shown in FIG. 1, but a mobile telecommunication network will typically comprise tens of thousands of cells. Each eNB 2 is connected by a wired link to a core network (not shown).

Figure 2:
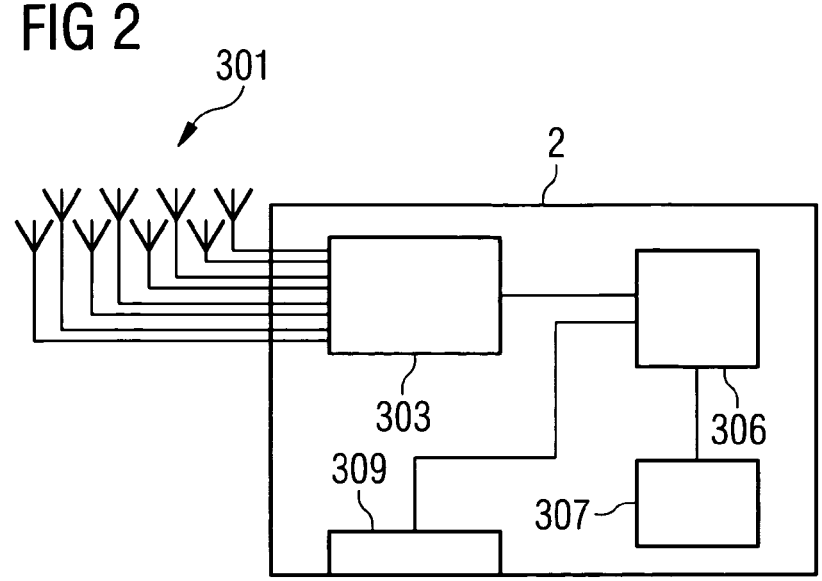
FIG. 2 illustrates an example of apparatus for use at eNodeB in FIG. 1.

FIG. 2 shows a schematic view of an example of user equipment 8 that may be used for communicating with the eNBs 2 of FIG. 1 via a wireless interface. The user equipment (UE) 8 may be used for various tasks such as making and receiving phone calls, for receiving and sending data from and to a data network and for experiencing, for example, multimedia or other content.

The UE 8 may be any device capable of at least sending or receiving radio signals to or from the eNBs 2 of FIG. 1. Non-limiting examples include a mobile station (MS), a portable computer provided with a wireless interface card or other wireless interface facility, personal data assistant (PDA) provided with wireless communication capabilities, or any combinations of these or the like. The UE 8 may communicate via an appropriate radio interface arrangement of the UE 8. The interface arrangement may be provided for example by means of a radio part and associated antenna arrangement. The antenna arrangement may be arranged internally or externally to the UE 8, and may include a plurality of antennas capable of operating in the kind of multi-layer transmission scheme described below.

The UE 8 may be provided with at least one data processing entity 203 and at least one memory or data storage entity 217 for use in tasks it is designed to perform. The data processor 213 and memory 217 may be provided on an appropriate circuit board 219 and/or in chipsets.

The user may control the operation of the UE 8 by means of a suitable user interface such as key pad 201, voice commands, touch sensitive screen or pad, combinations thereof or the like. A display 215, a speaker and a microphone may also be provided. Furthermore, the UE 8 may comprise appropriate connectors (either wired or wireless) to other devices and/or for connecting external accessories, for example hands-free equipment, thereto.

UE 8 may also be a relay node configured to relay transmissions from eNB 2 to one or more communication devices.

Figure 3:
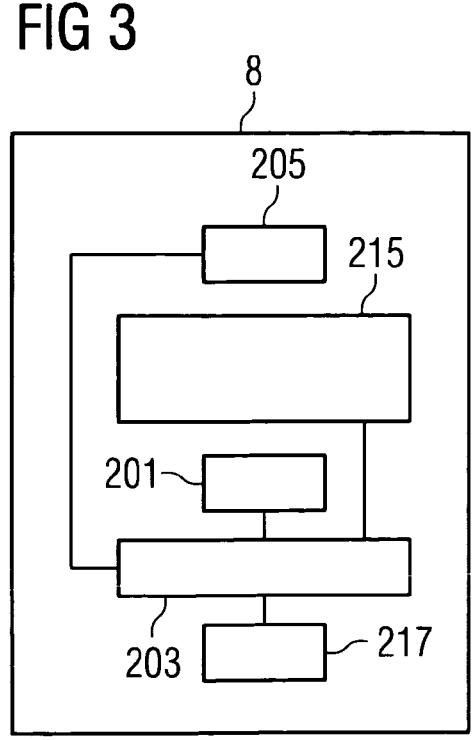
FIG. 3 illustrates an example of apparatus for use at user equipment in FIG. 1.

FIG. 3 shows an example of apparatus for use at the eNBs 2 of FIG. 1 and for serving the cell 4 in which UE 8 is located. The apparatus comprises a radio frequency antenna array 301 configured to receive and transmit radio frequency signals; radio frequency interface circuitry 303 configured to interface the radio frequency signals received and transmitted by the 8-antenna array 301 and the data processor 306. The radio frequency interface circuitry 303 may also be known as a transceiver. The apparatus also comprises an interface 309 via which it can send and receive information to and from one or more other network nodes. The data processor 306 is configured to process signals from the radio frequency interface circuitry 303, control the radio frequency interface circuitry 303 to generate suitable RF signals to communicate information to the UE 6 via the wireless communications link, and also to exchange information with other network nodes via the interface 309. The memory 307 is used for storing data, parameters and instructions for use by the data processor 306.

It would be appreciated that the apparatus shown in each of FIGS. 2 and 3 described above may comprise further elements which are not directly involved with the embodiments of the invention described hereafter.

FIGS. 4 and 5 illustrate an embodiment of the present invention for the example of an UL transmission from UE 8a. The embodiment involves a scheduling and resource allocation scheme for a time division duplexing (TDD) system in which the scheduling functionality for an UL transmission from UE 8a is divided into two parts: (1) initial scheduling is done by UE 8a; and (2) final scheduling decision is made by eNB 2a.

According to one example, UE 8a makes an initial scheduling decision (STEP 402) based on one or more of the following types of information:
(i) information about amount of data buffered at UE 8a;
(ii) estimated pathloss information for the uplink between UE 8a and the eNB 2a receiver for the serving cell 4a;
(iii) channel state information (CSI) for the uplink between UE 8a and the eNB 2a receiver for the serving cell 4a;
(iv) interference conditions at the eNB 2a receiver for the serving cell 4a; and
(v) any information that might be available to UE 8a about interference at the uplink receivers for neighbouring cells 4b and/or at other UEs 8b in the same cell 4a or neighbouring cells 4b.

Estimated pathloss information and CSI for the uplink between UE 8a and the eNB 2a receiver for serving cell 4a in this TDD system can be derived by UE 8a from measurements at UE 8a of transmissions made by the eNB 2a transmitter for the serving cell 4a. For example, UE 8a can use the same measurements that UE 8a uses to provide channel state information to eNB 2a for configuring downlink transmissions in the serving cell 4a.

In order to facilitate the initial scheduling decisions at UE 8a, each cell 4 transmits information about levels (cell-specific and frequency (/time) specific levels) of interference (e.g. interference over thermal noise) measured at the eNB receiving antennas for that cell; information about the planned scheduling decisions related to (maximum) interference level at the Rx side; and information about power allocation. Information about planned scheduling decisions can include, for example, information about semi-persistent UL scheduling, and polling of other UEs etc. that may cause interference with the UL transmission from UE 8a, and vice versa.

The information transmitted by each cell 4 may include the applied and/or planned UL/DL ratio of the TDD system for that cell. The UL/DL ratio indicates the amount of time resources allocated to the uplink relative to the downlink.

The above-mentioned information can be transmitted by eNBs 2 as part of broadcasted system information (SI), beacon signalling or via a cognitive pilot channel (in the case of shared spectrum usage among multiple operators); and UE 8a listens for such information transmitted by the serving cell 4a and the information of this kind transmitted by neighbouring cells 4b (STEP 400).

UEs 8 may also transmit information about the levels of interference measured at their receiving antennas; and, as mentioned below, UE 8a may additionally use this information for initial scheduling decisions for device-to-device (D2D) transmissions to other communication devices in the frequency spectrum managed by the access network.

The use of interference level information from the serving cell 4a, neighbouring cells 4b and other UEs 8b allows UE 8a to better take interference conditions properly into account when making the initial scheduling decision, and to better optimise the initial scheduling decision for better avoiding inter-cell interference.

The interference level information can be one of the following types: (a) measured interference level (frequency and/or time specific); and (b) predicted interference level (frequency and/or time specific). Measured interference level is a measurement of interference and noise.

Based on the initial scheduling decision, UE 8a forms a tentative resource request (TRR) message for sending to serving eNB 2a. The TRR message is recognised by serving eNB 2a as a scheduling request. The TRR message contains a tentative resource allocation decided by UE 8a. The TRR message could, for example, adopt the message format currently proposed in LTE for communicating the grant of radio resources for DL transmissions. The transmission parameters about which UE 8a makes an initial decision, and for which information elements are included in the TRR message, can include the following:
(a) number of physical resource blocks (PRBs) to be used for the uplink transmission;
(b) frequency and (/or) time resources for the uplink transmission;
(c) modulation and coding scheme for the UL transmission;
(d) transport block size for the UL transmission;
(e) type of multi-input multi-output (MIMO) scheme to be used for the UL transmission;
(f) transmission rank for the UL transmission;
(g) precoder vector for the UL transmission.

The TRR message can additionally include information that is useful to serving eNB 2 for resolving conflicts that happen to arise between the initial scheduling decision made by UE 8a and one or more initial scheduling decisions made at one or more other UEs 8b. Additional information can, for example, be information about the priority status of UE 8a, and/or the connection or data for which the initial scheduling decision was made. This additional information can be used by serving eNB 2a to prioritize received initial scheduling decisions in case several UEs 8 happen to request the same UL resources. The additional information can also include alternative preferred resource allocation options or channel state information in case serving eNB 2a cannot allocate the most preferred resources (as defined by the initial scheduling decision).

Serving eNB 2a can also derive additional information from the initial scheduling decision. For example, serving eNB 2a can derive information about the amount of buffered data at UE 8a from the modulation and coding scheme and/or transport block size decided by UE 8 and indicated in the TRR message.

UE 8a transmits the TRR message to the serving eNB 2a (STEP 404). This transmission can be made via UL resources dedicated to UE 8a, or via resources that are not dedicated to UE 8a but are contention based resources commonly available to a plurality of UEs 8 served by the serving cell 4a. The TRR message could be multiplexed with UL data, whereby a data transmission for a transport block is accompanied by an indication of the initial scheduling decision for the next or some further transport block. A pre-defined format can be defined for the TRR message.

Serving eNB 2a detects the TRR message (STEP 406). This may or may not involve blind decoding depending on the modulation method used for transmitting the TRR message. The TRR message may be transmitted via dedicated resources or via contention based common resources.

Serving eNB 2a makes the final scheduling decision (STEP 408) based on the initial scheduling decision indicated in the TRR message. Serving eNB 2a includes a Multi-User Scheduler that functions to coordinate UL transmissions from the plurality of UEs 8 in the serving cell, so as to avoid excessive interference at the receiving antennas for the serving cell 4a. The Multi-User Scheduler of Serving eNB 2a determines whether the initial scheduling decision indicated in the TRR message from UE 8a is compatible with initial scheduling decisions made by other UEs 8b in the serving cell 4a, and also with other scheduling decisions made by Serving eNB 2a. In a simple embodiment, serving eNB 2a either (i) accepts the initial scheduling decision and allocates UL resources to UE 8a in accordance with the initial scheduling decision, or (ii) allocates no UL resources to UE 8a in response to the scheduling request, if the initial scheduling decision does not meet predetermined conditions for compatibility with TRR messages from other UEs 8b and also other scheduling decisions made by Serving eNB 2a. In a more sophisticated embodiment, serving eNB 2a either (a) confirms the initial scheduling decision or (b) decides on changes to one or more of the transmission parameters about which UE 8a made the initial scheduling decision. This final scheduling decision takes care of sharing the UL resource among multiple UEs 8.

Serving eNB 2a transmits a scheduling grant message indicating the final scheduling decision to UE 8a (STEP 410).

There are different ways to design the scheduling grant message. For example, it is possible to use an existing format that is specified as standard for existing techniques that do not involve the transmission of initial scheduling grant decisions, or to use a different format. For example, a scheduling grant message of reduced size can be achieved by only indicating in the scheduling grant message how the final scheduling decision made by serving eNB 2a differs to the initial scheduling decision made by UE 8a. On the other hand, the use of an existing standard format has the advantage of reduced system complexity.

In the very simple embodiment mentioned above, serving eNB 2a can use simple ACK/NACK signaling to communication the result of its final decision whether to make a scheduling grant in accordance with the initial scheduling decision, or not to make any scheduling grant.

In the more sophisticated embodiment mentioned above, efficient communication of the difference between the initial scheduling decision and the final scheduling decision can be achieved using index numbers that are mapped in a predetermined look-up table prestored at both UE 8a and serving eNB 2a to respective ones of possible differences between an initial scheduling decision and a final scheduling decision.

The final scheduling grant can be sent via a physical downlink control channel (e.g. PDCCH). The downlink control channel transmission can, for example, be a multi-antenna precoded transmission which is demodulated at UE 8a based on non-precoded reference signals and an explicit indication of the precoding vector/matrix for the transmission; or an enhanced transmission mode according to which reference signals are subjected to the same precoding as the symbols generated from the bit stream containing the final scheduling grant information.

UE 8a detects the final scheduling grant (STEP 412); and makes an UL data transmission in accordance with the final scheduling grant (STEP 414).

One possible extension to the technique described above is for UE 8a to determine which cell has the best radio conditions for UE 8a, and to transmit the TRR message to that cell (which may or may not be the serving cell). As mentioned below, the above-described technique can also be used for transmissions between two UEs, including D2D transmissions as part of multi-hop uplink transmissions from a UE towards the access network. A UE could take radio conditions into account when determining which one of a plurality of neighbouring UEs to use for one hop of a multi-hop transmission towards the access network, and then transmit the TRR message to the selected neighbouring UE.

In the above-described technique, the use of measurements of downlink transmissions and interference information transmitted by other UEs 8b for the initial scheduling decision enables improved utilization of channel reciprocity in the TDD system and support for distributed inter-cell interference control (ICIC) functionality.

In the above-described technique, making the initial scheduling decision at UE 8a can enable more accurate UL resource allocation, because the scheduling decision can be made closer in time to the UL data transmission for which the scheduling decision is made. For example, the scheduling decision can be made on information about e.g. UE buffer status and pathloss, that can be more real time than could be possible in a system in which a significant amount of delay occurs between preparing such information at UE and making a scheduling decision at the access network based on such information.

In the above-described technique, making the initial scheduling decision at UE 8a can reduce uplink signalling overhead by reducing the need for UE to transmit separate sounding reference signals and power headroom reports to eNB.

In the above-described technique, constituting the final scheduling grant message as an indication of the differences between the initial scheduling decision and the final scheduling decision (or in the simplest embodiment described above, constituting the communication of the final scheduling grant as a simple binary indication (ACK/NACK) of whether or not the initial scheduling decision is accepted by serving eNB 2a), can reduce downlink signalling overhead.

The above detailed description is provided for the example of an uplink transmission from a UE to an eNB. However, the same kind of technique can also be used for D2D transmissions from one UE to another UE, in which an initial scheduling decision is made by the UE from which the transmission is to be made, and sent to the UE that is receive the transmission to which the initial scheduling decision relates. The same kind of technique could also be used for transmissions between eNBs, in which an initial scheduling decision is made by the eNB from which the transmission is to be made, and sent to the eNB that is receive the transmission to which the initial scheduling decision relates.

The above-described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

The invention claimed is:

1. A method comprising:
   determining, by a communication device based on channel state information and an amount of data buffered at the communication device, an initial scheduling decision about one or more transmission parameters for a transmission from said communication device to an access network or another communication device via radio resources managed by an access network, the one or more transmission parameters including information relating to an amount of resources for the transmission;
   communicating the initial scheduling decision to said access network or said another communication device; and
   receiving, by the communication device from said access network or said another communication device, an indication of a final scheduling decision about the transmission parameters for said transmission from said communication device to said access network or another communication device, the final scheduling decision indicating a change to one or more of the transmission parameters as compared to the initial scheduling decision;
   wherein the method further comprises:
      sending, by the communication device to said access network or another communication device, priority information indicating a priority status for the initial scheduling decision, the priority information to be used by said access network or another communication device to prioritize initial scheduling decisions received from different communication devices;
      wherein the initial scheduling decisions are prioritized in response to a resolution of a conflict, based on the priority status of the initial scheduling decision, between the initial scheduling decision received from the communication device and the one or more other initial scheduling decisions from one or more other communication devices to change the one or more transmission parameters of the initial scheduling decision for the final scheduling decision.

2. A method according to claim 1, comprising:
   detecting interference information transmitted by said access network or said another communication device about interference at the receiver for said transmission from said communication device; and
   wherein the determining an initial scheduling decision is based at least in part on said interference information transmitted by said access network or said another communication device.

3. A method according to claim 2, wherein said receiver for said transmission from said communication device comprises an array of receiving antennas; and
   wherein said interference information includes information about interference at each of said receiving antennas or group of antennas.

4. A method according to claim 1, wherein said transmission from said communication device is to another communication device, and further comprising:
   detecting interference information transmitted by said another communication device about interference at the receiver for said transmission; and
   wherein the determining an initial scheduling decision is based at least in part on said interference information transmitted by said another communication device.

5. A method according to claim 1, wherein said indication of a final scheduling decision about the transmission parameters for said transmission from said communication device to said access network or another communication device comprises an indication of a difference between said initial scheduling decision and said final scheduling decision.

6. A method according to claim 1, wherein the transmission from said communication device is an uplink transmission to said access network, the method further comprising:
   determining at said communication device which network cell exhibits a best radio link with said communication device, and using said network cell for communicating said provisional decision to said access network.

7. A method comprising:
   receiving from a communication device at an access network or another communication device an initial scheduling decision made at said communication device about one or more transmission parameters for a transmission from said communication device to said access network or another communication device via radio resources managed by the access network, the initial scheduling decision indicating at least information relating to an amount of resources for the transmission and a priority status for the initial scheduling decision;
   prioritizing, by the access network, the initial scheduling decision based on the priority status;
   determining, by the access network or another communication device based on the prioritizing, a final scheduling decision for the transmission, the final scheduling decision indicating a change to one or more of the transmission parameters as compared to the initial scheduling decision; and
   transmitting by the access network or the another communication device to said communication device an indication of the final scheduling decision about the transmission parameters for said transmission from said communication device to said access network or another communication device;
wherein the method further comprises receiving at said access network or another communication device one or more other initial scheduling decisions from one or more other communication devices; and
wherein the prioritizing the initial scheduling decision comprises resolving a conflict, based on the priority status of the initial scheduling decision, between the initial scheduling decision received from the communication device and the one or more other initial scheduling decisions from one or more other communication devices, and changing one or more transmission parameters of the initial scheduling decision for the final scheduling decision.

8. A method according to claim 7, comprising:
transmitting from said access network or another communication device interference information about interference at the receiver for said transmission from said communication device, which interference information is of use by said communication device when determining said initial scheduling decision.

9. A method according to claim 8, wherein said receiver for said transmission from said communication device comprises an array of receiving antennas; and
wherein said interference information includes information about interference at each of said receiving antennas or group of antennas.

10. A method according to claim 7, wherein said indication of the final scheduling decision comprises an indication of a difference between said initial scheduling decision and said final scheduling decision.

11. A method according to claim 7, wherein one or more of an estimate of a pathloss for a link between the communication device and the access node serving the communication device, and channel state information for the link between the communication device and the access node serving the communication device, is derived from measurements at said communication device of transmissions made by the access node serving the communication device.

12. An apparatus comprising:
a processor and memory including computer program code, wherein the memory and computer program code are configured to, with the processor, cause the apparatus to:
determine, by a communication device based on channel state information and an amount of data buffered at the communication device, an initial scheduling decision about one or more transmission parameters for a transmission from said communication device to an access network or another communication device via radio resources managed by an access network, the one or more transmission parameters including information relating to an amount of resources for the transmission;
communicate the initial scheduling decision to said access network or said another communication device; and
receive, by the communication device from said access network or said another communication device, an indication of a final scheduling decision about the transmission parameters for said transmission from said communication device to said access network or another communication device, the final scheduling decision indicating a change to one or more of the transmission parameters as compared to the initial scheduling decision;

wherein the memory and computer code are further configured to:
send, to said access network or another communication device, priority information indicating a priority status for the initial scheduling decision, the priority information to be used by said access network or another communication device to prioritize initial scheduling decisions received from different communication devices;
wherein the initial scheduling decisions are prioritized in response to a resolution of a conflict, based on the priority status of the initial scheduling decision, between the initial scheduling decision received from the communication device and the one or more other initial scheduling decisions from one or more other communication devices to change the one or more transmission parameters of the initial scheduling decision for the final scheduling decision.

13. An apparatus according to claim 12, wherein the memory and computer program code are further configured to, with the processor, cause the apparatus to:
detect interference information transmitted by said access network or said another communication device about interference at the receiver for said transmission from said communication device; and
wherein the determining an initial scheduling decision is based at least in part on said interference information transmitted by said access network or said another communication device.

14. An apparatus according to claim 13, wherein said receiver for said transmission from said communication device comprises an array of receiving antennas; and
wherein said interference information includes information about interference at each of said receiving antennas or group of antennas.

15. An apparatus according to claim 12, wherein said transmission from said communication device is to another communication device, and wherein the memory and computer program code are further configured to, with the processor, cause the apparatus to:
detect interference information transmitted by said another communication device about interference at the receiver for said transmission; and
wherein the determining an initial scheduling decision is based at least in part on said interference information transmitted by said another communication device.

16. An apparatus according to claim 12, wherein said indication of a final scheduling decision about the transmission parameters for said transmission from said communication device to said access network or another communication device comprises an indication of a difference between said initial scheduling decision and said final scheduling decision.

17. An apparatus comprising:
a processor and memory including computer program code, wherein the memory and computer program code are configured to, with the processor, cause the apparatus to:
receive from a communication device at an access network or another communication device an initial scheduling decision made at said communication device about one or more transmission parameters for a transmission from said communication device to said access network or another communication device via radio resources managed by the access network, the initial scheduling decision indicating at least information relating to an amount of resources for the transmission and a priority status for the initial scheduling decision;

prioritize, by the access network, the initial scheduling decision based on the priority status;

determine, by the access network or another communication device based on the prioritizing, a final scheduling decision for the transmission, the final scheduling decision indicating a change to one or more of the transmission parameters as compared to the initial scheduling decision; and transmit by the access network or the another communication device to said communication device an indication of the final scheduling decision about the transmission parameters for said transmission from said communication device to said access network or another communication device;

wherein the computer program code is further configured to receive at said access network or another communication device one or more other initial scheduling decisions from one or more other communication devices; and wherein the computer program code configured to prioritize the initial scheduling decision is further configured to resolve a conflict, based on the priority status of the initial scheduling decision, between the initial scheduling decision received from the communication device and the one or more other initial scheduling decisions from one or more other communication devices, and changing one or more transmission parameters of the initial scheduling decision for the final scheduling decision.

18. A non-transitory computer-readable storage medium storing instructions that when executed cause a processor to:

determine, by a communication device based on channel state information and an amount of data buffered at the communication device, an initial scheduling decision about one or more transmission parameters for a transmission from said communication device to an access network or another communication device via radio resources managed by an access network, the one or more transmission parameters including information relating to an amount of resources for the transmission;

communicate the initial scheduling decision to said access network or said another communication device; and receive, by the communication device from said access network or said another communication device, an indication of a final scheduling decision about the transmission parameters for said transmission from said communication device to said access network or another communication device, the final scheduling decision indicating a change to one or more of the transmission parameters as compared to the initial scheduling decision;

wherein the instructions, when executed, further cause the processor to:

send, to said access network or another communication device, priority information indicating a priority status for the initial scheduling decision, the priority information to be used by said access network or another communication device to prioritize initial scheduling decisions received from different communication devices;

wherein the initial scheduling decisions are prioritized in response to a resolution of a conflict, based on the priority status of the initial scheduling decision, between the initial scheduling decision received from the communication device and the one or more other initial scheduling decisions from one or more other communication devices to change the one or more transmission parameters of the initial scheduling decision for the final scheduling decision.

19. A non-transitory computer-readable storage medium storing instructions that when executed cause a processor to:

receive from a communication device at an access network or another communication device an initial scheduling decision made at said communication device about one or more transmission parameters for a transmission from said communication device to said access network or another communication device via radio resources managed by the access network, the initial scheduling decision indicating at least information relating to an amount of resources for the transmission and a priority status for the initial scheduling decision;

prioritize, by the access network, the initial scheduling decision based on the priority status;

determine, by the access network or another communication device based on the prioritizing, a final scheduling decision for the transmission, the final scheduling decision indicating a change to one or more of the transmission parameters as compared to the initial scheduling decision; and transmit by the access network or the another communication device to said communication device an indication of the final scheduling decision about the transmission parameters for said transmission from said communication device to said access network or another communication device;

wherein the instructions further cause the computer to receive at said access network or another communication device one or more other initial scheduling decisions from one or more other communication devices; and wherein the instructions that cause the computer to prioritize the initial scheduling decision further cause the computer to resolve a conflict, based on the priority status of the initial scheduling decision, between the initial scheduling decision received from the communication device and the one or more other initial scheduling decisions from one or more other communication devices, and changing one or more transmission parameters of the initial scheduling decision for the final scheduling decision.

* * * * *